United States Patent [19]

Coe

[11] 4,393,600
[45] Jul. 19, 1983

[54] STRUCTURAL BEAM SQUARE

[76] Inventor: Norman O. Coe, 2600 Senter Rd. #77, San Jose, Calif. 95111

[21] Appl. No.: 315,538

[22] Filed: Oct. 27, 1981

[51] Int. Cl.³ .............................................. G01B 3/30
[52] U.S. Cl. ......................................... 33/474; 33/44; 33/158; 33/143 R
[58] Field of Search ................. 33/474, 479, 480, 161, 33/158, 44, 143 R

[56] References Cited

U.S. PATENT DOCUMENTS

| 858,791 | 7/1907 | Breul | 33/480 |
| 897,987 | 9/1908 | Mezger | 33/44 |
| 1,032,594 | 7/1912 | Ferguson et al. | 33/480 |
| 3,325,903 | 6/1967 | Zurlinden | 33/158 |
| 4,008,522 | 2/1977 | Anderson | 33/44 |

FOREIGN PATENT DOCUMENTS

| 191166 | 8/1957 | Austria | 33/474 |
| 1061054 | 7/1959 | Fed. Rep. of Germany | 33/480 |

Primary Examiner—Willis Little
Attorney, Agent, or Firm—Victor R. Beckman

[57] ABSTRACT

A structural beam square for laying out the web of a structural steel beam, or the like, is disclosed which includes a pair of arms which extend at right angles to each other. The arms have a T-shaped cross section and include coplanar stem members and flanges which extend along the inner edges of the stem members. The flanges support the square on the web of a beam with the stem portions at a raised position above the web, and above the fillet at the intersection of the beam web and beam flange. Gauge members are releasably secured to one arm of the square, which gauge members include gauge plates which are of the same height as the arm flanges. With one arm of the square abutting the beam flange, a line may be scribed across the web along the flange of the other arm. The square is moved along the web, and cross marks are scribed on the web along the gauge plates of the gauge members secured to said other square arm.

4 Claims, 9 Drawing Figures

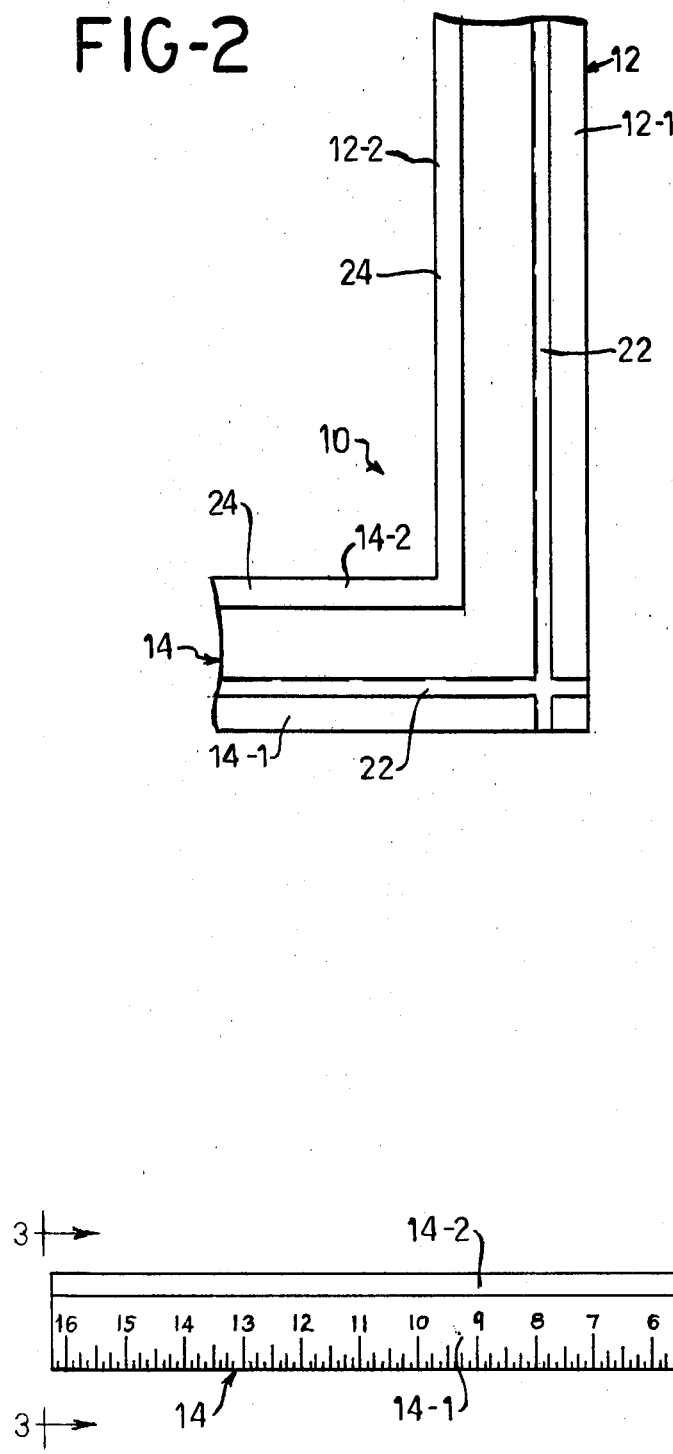
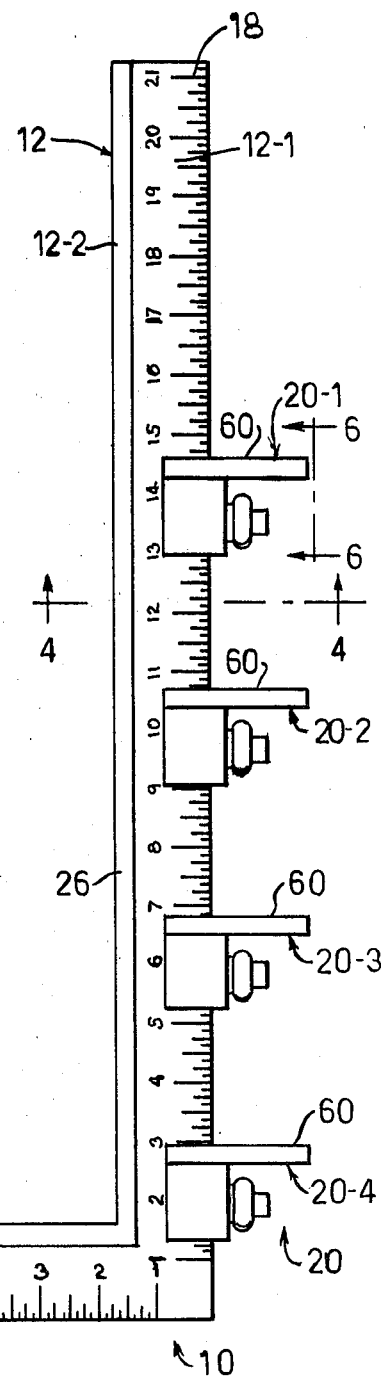
FIG-2
FIG-1

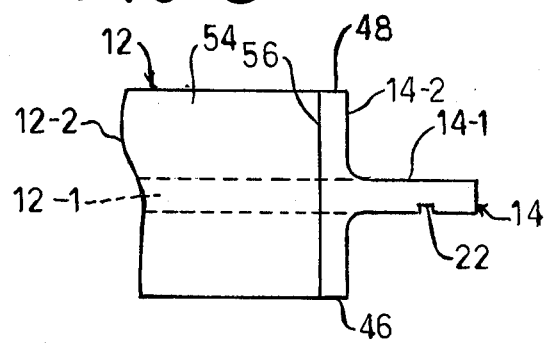
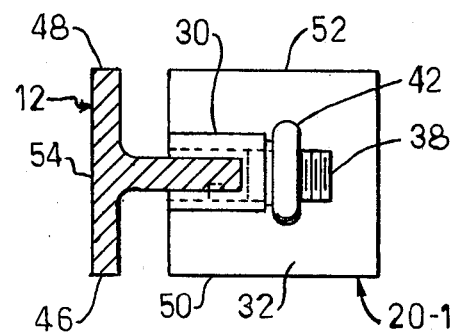
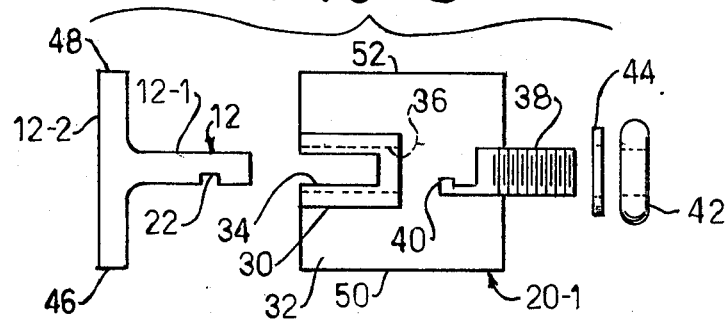
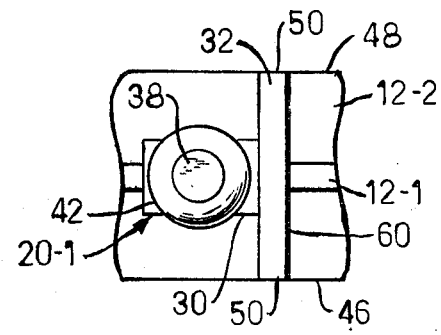
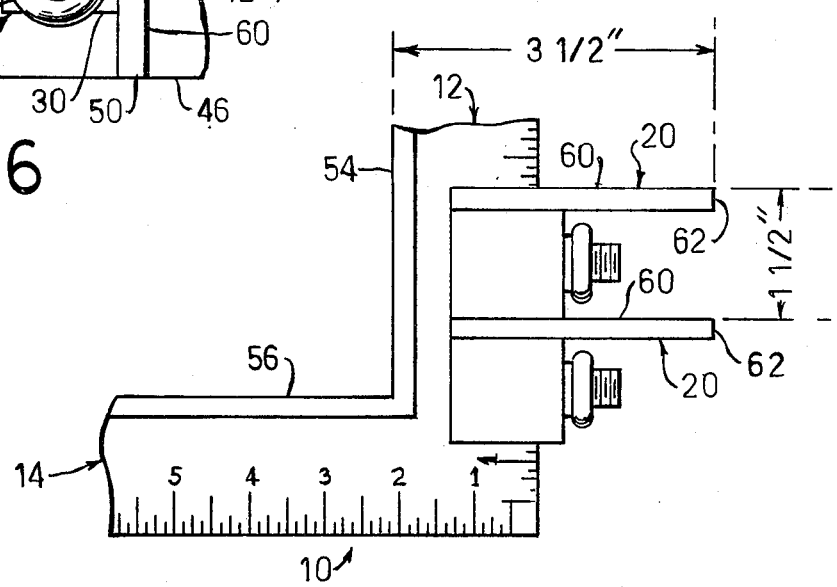

STRUCTURAL BEAM SQUARE

BACKGROUND OF THE INVENTION

Layout tools for laying out the web of structural steel beams and girders are known as disclosed in the following U.S. Pat. Nos.: 1,382,721—E. W. Cunningham; 4,228,594—A. E. Shlager; 1,046,187—W. Hernlund; 1,725,476—M. J. Poppock; 1,826,807—A. J. McDanel; and 3,731,390—J. L. Sloan et al. Steel squares also are well known. Some prior art layout tools are of complicated construction and expensive. Many are difficult to use and do not substantially speed up the layout process. Use of a simple steel square to layout the web of the beam often results in inaccurate measurements due to the presence of the fillet at the intersection of the beam web and flange which prevents butting one arm of the square against the flange while maintaining flat surface contact with the web by the other arm.

SUMMARY OF THE INVENTION AND OBJECTS

An object of this invention is the provision of an improved structural beam square for laying out structural beam webs which avoids the above-mentioned problems and short comings of prior art squares and web lay out tools.

An object of this invention is the provision of a structural beam square of the above-mentioned type which is adapted to lie flat upon the beam's web while one arm of the square is in abutting position with the inside surface of the beam's flange in parallel position with the web.

An object of this invention is the provision of a structural beam square which includes a plurality of gauge members releasably attached to the arms of the square and having surfaces for use in marking lines on the web extending parallel with the flange.

The above and other objects and advantages of this invention are achieved by means of a unitary member which includes a pair of arms extending at right angles to each other. The arms are T-shaped in cross section and include coplanar stem members and flanges extending along the inner edges of the stem members, which flanges have coplanar upper edges and coplanar lower edges adapted for support upon the web of a structural beam. The outer edge of either stem may be positioned against the inside surface of the flange of the structural beam, at a point above the fillet at the intersection of the structural beam web and flange to avoid interference therewith. Gauge members are releasably secured to either arm of the square, and scale indicia along the stems of the arms provide means for readily and accurately positioning the gauge members along the stems. The gauge members are provided with arms which extend at right angles from the edge of the stem to which the members are attached. Upper and lower edges of the gauge member arms are coplanar with the respective upper and lower edges of the stem flanges to facilitate marking the web by use thereof. When butted together, the gauge member arms are a standard dimension apart for use in marking the web with such standard dimension. A second standard dimension is provided between the tip of the gauge member arm and the outer flange surface of the arm of the square to which the gauge member is secured.

The invention, together with other objects and advantages thereof will be better understood from the following description when considered with the accompanying drawings.

BRIEF DESCRIPTION OF THE DRAWINGS

In the drawings, wherein like reference characters refer to the same parts in the several views;

FIG. 1 is a plan view of a structural beam square embodying the present invention;

FIG. 2 is an enlarged fragmentary bottom view of the square showing grooves formed along the arms thereof for use in attachment of gauge members to the arms;

FIG. 3 is an enlarged end view taken along line 3—3 of FIG. 1;

FIG. 4 is an enlarged sectional view taken along line 4—4 of FIG. 1;

FIG. 5 is an enlarged exploded view showing details of means for releasably attaching the gauge members to the square arm;

FIG. 6 is an enlarged fragmentary side elevational view taken along line 6—6 of FIG. 1;

FIG. 7 is an enlarged fragmentary plan view illustrating standard dimensions which may be incorporated in the square construction;

Figure 8:
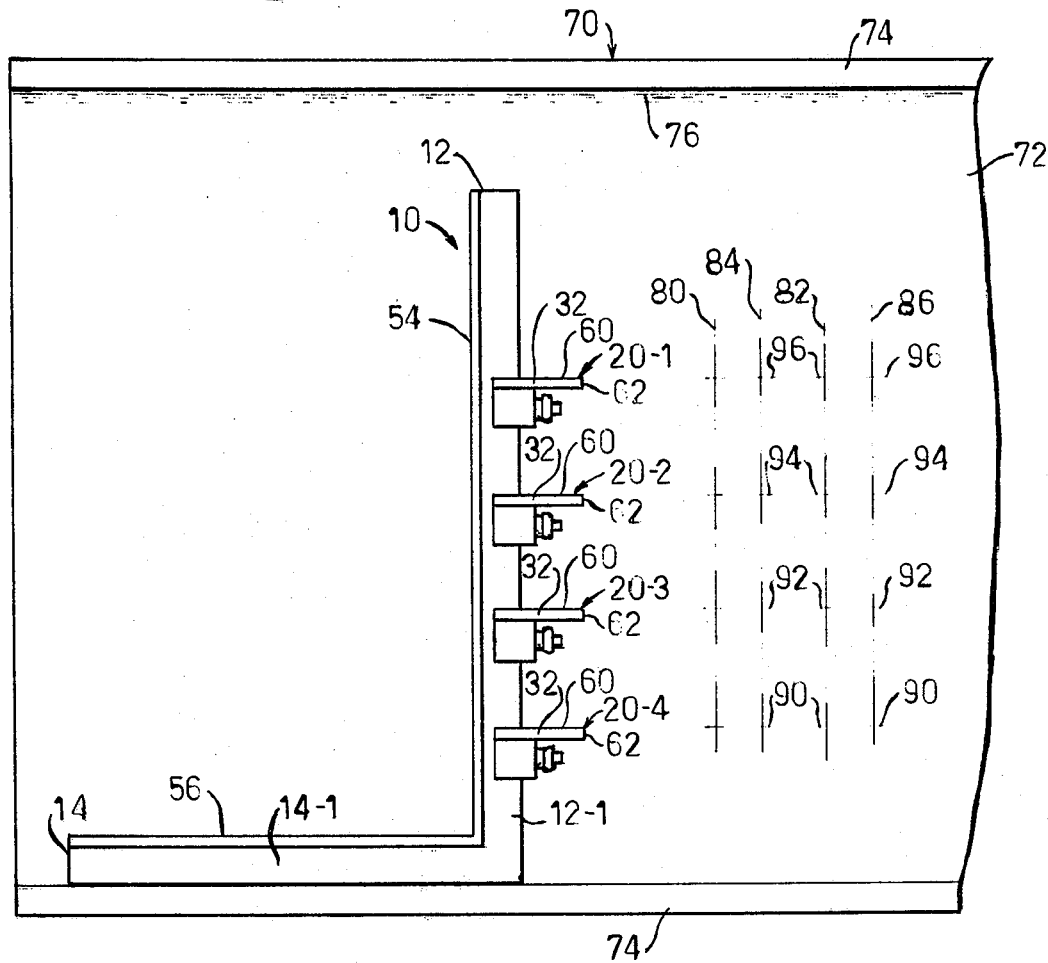
FIG. 8 is a simplified plan view, on a reduced scale, of the square and a fragmentary portion of a structural steel beam being laid out by the square.

Reference first is made to FIG. 1 wherein the novel structural beam square 10 of this invention is shown comprising arms 12 and 14 extending at right angles to each other. The arms comprise a unitary structure, with each arm having a substantially T-shaped cross-section as best seen in the respective end and cross-sectional views of FIGS. 3 and 4. The arms 12 and 14 include coplanar stem portions 12-1 and 14-1, and vertical flanges 12-2 and 14-2 which extend along the inner edges of the stem portions. Linear scale indicia 16 and 18 are provided on the upper faces of the stem portions 12-1 and 14-1 along the outer edges thereof for use in positioning gauge members 20 at desired positions along either one of said arms 12 and 14. For purposes of illustration, four gauge members identified by reference characters 20-1, 20-2, 20-3 and 20-4 are shown secured to the arm 12. Elongated grooves 22 extending along arms 12 and 14 at the bottom face of the stem portions 12-1 and 14-1 thereof are employed for releasable attachment of the gauge members to the arms, in a manner described below.

Referring to FIGS. 4-6, the gauge member 20-1 is shown comprising a mounting block 30 and gauge plate 32 integrally formed with the mounting block. A channel 34 is formed in the mounting block and gauge plate into which the stem 12-1 of arm 12 extends. The mounting block 30 is formed with an aperture 36 extending transversely of the channel axis, and a locking stem 38 is slideably received in the aperture 36. As best seen in FIG. 5, the locking stem comprises a threaded cylindrical shaped body portion formed with an L-shaped hook 40 at one end thereof adapted for engagement with the groove 22 in one of the arms 12 or 14 of the square. A nut threadedly engages the locking stem 38 which, when finger tightened, locks the gauge member 20-1 at the desired setting on the stem 12-1 of the square. A flat washer 44 between the nut 42 and mounting block 30 reduces wear on the mounting block and facilitates tightening and loosening of the nut 42 on the stem 38. The illustrated releasable locking means is, essentially, of the same type as that employed for releasably securing the blade to the housing of a combination square.

Figure 9:
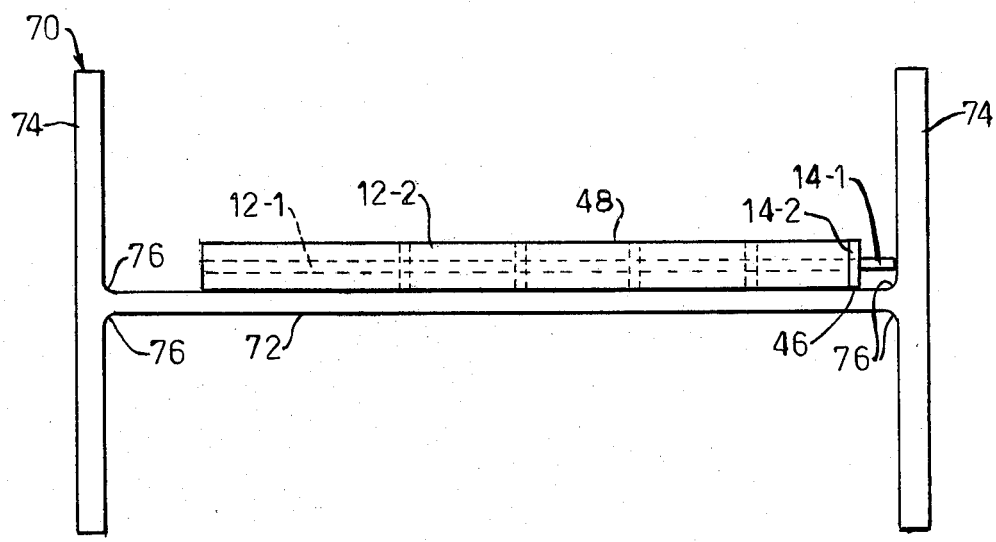
FIG. 9 is an end view of the beam and side elevational view of the square shown in FIG. 9.

As seen in FIGS. 3 and 9, the flanges 12-2 and 14-2 on the arms of the square are of equal and uniform height, and include parallel lower and upper surfaces 46 and 48, respectively. The gauge plates 32 of the gauge members are of the same height as the arm flanges and include lower and upper surfaces 50 and 52 which are substantially coplanar with the respective flange surfaces 46 and 48. The outer, free, faces of the flanges 12-2 and 14-2 are identified by reference characters 54 and 56, respectively. In use, as described below, one of these faces serves as a guide along which lines may be scribed across the web of a structural beam. Similarly, free faces 60 on the gauge plates 32 serve as guides along which lines may be scribed on the web of the structural beam in a direction along the beam axis.

It will be apparent that the arms 12 and 14 of the square are not limited to the illustrate lengths. Squares having different length arms may be provided for use with structural beams having different web dimensions. Two standard dimensions are provided by the present arrangement as illustrated in FIG. 7 to which figure reference now is made. There it will be seen that the gauge members 20 have an overall width of 1½ inches. Consequently, when gauge members are positioned in abutting relationship along one of the arms, here arm 12, lines scribed on the beam web using surfaces 60 on the gauge plates 32 are 1½ inches apart. Also, the outer faces 62 of the gauge plates 32 are spaced 3½ inches from the outer flange face of the associated arm, here flange face 54. With one line scribed on the web along face 54, a 3½ inch dimension is obtained by scribing along the face 62 of one of the gauge plates. Additionally, it here will be noted that the gauge member mounting block 30 and integral gauge plate 32 are of symmetrical construction about a horizontal center plane. Consequently they may be mounted on a stem in inverted position to allow for scribing lines closer to the inside of the beam's flange. Individual choice and convenience may dictate which way the gauge members are secured to the arm of the square.

Reference now is made to FIGS. 8 and 9 of the drawings wherein the use of the square 10 for laying out the web of a structural beam 70 is shown. The beam includes a web 72 and flanges 74. In the manufacture of structural steel beams fillets 76 are formed at the junctions between the web and flanges. The square rests on the web 72 of the beam, and the stem of one arm of the square is abutted against the inner face of one of the flanges. In FIGS. 8 and 9, the stem 14-1 is shown positioned against one of the beam flanges 74. As seen in FIG. 9, the stem 14-1 clears the adjacent fillet 76, thereby allowing for abutment of the stem 14-1 with the flange 74 while the flange surfaces 46 of the square rest directly upon the web 72. As noted above, when a framing square is used in the layout of a beam web, the fillets prevent one edge of the square from abutting the beam flange when the square is resting flat upon the beam web.

Using a measuring tape, one dimension on the web from one end of the structural beam is established. Face 54 of flange 12-2 is located at this dimension, and with stem 14-1 positioned against the structural beam flange, a line is scribed across the web along the length of face 54. For example, line 80 may be scribed first in this manner. The line extends perpendicular to the flange 74 against which the stem 14-1 of arm 14 abuts. With the square in position for scribing line 80, a 3½ inch dimension from the line 80 is established by the outer free ends 62 of the gauge plates 32. This dimension may be scribed on the web, and the square shifted to the right, as viewed in FIG. 8, to locate the face 54 of flange 12-2 thereat. Holding the stem 14-1 against the beam flange, a second line 82 may be scribed which is parallel to line 80 at a distance of 3½ inches therefrom. Lines 84 and 86 may be established in a similar manner to the establishment of lines 80 and 82, respectively.

Dimensions across the web of the beam may be referenced from the outer face of either beam flange 74. To establish the positions of the gauge members 20-1 through 20-4 along arm 12 of the square, the thickness of the beam flange 74 is simply subtracted from the specified dimensions. For example, assume that one dimension is 6 inches from the top or bottom of the beam, and that three additional dimensions at 4 inch intervals therefrom are required. If the beam has a flange thickness of ⅜ inch, then the one gauge member 20-4 would be set at the 5⅝ inch mark on arm 12 (6"−⅜"=5⅝"). Gauge members 20-3, 20-2 and 20-1 would be set at the 9⅝ inch, 13⅝ inch, and 17⅝ inch marks, respectively, to provide the required four inch spacings. Lines 90, 92, 94 and 96 would then be scribed along the face 60 of each of the gauge plates at the intersections with transverse lines 80, 82, 84 and 86 to complete the illustrated layout.

The invention having been described in detail in accordance with requirements of the Patent Statutes, various changes and modifications will suggest themselves to those skilled in this art. As mentioned above, the use of squares having different length arms for laying out different size beams is contemplated. Also, the square may be employed with a different number of gauge members, depending upon the number of points across the web which are to be located. Since the gauge members are symmetrical about a horizontal center plane, use with the gauge plate either facing toward or facing away from the user is permitted. Also, the height of the flanges along the arms of the square, and the width of the arm stems, may be selected to assure clearance thereof with the radius along the intersection of the beam web and flange. That is, square arms of different cross-sectional dimensions may be employed, as required to accommodate different size beam fillets. Also, it will be apparent that the square is adapted for use with different structures which include a base and wall extending from the base against which wall the stem of one arm of the square may be abutted. It is intended that the above and other such changes and modifications shall fall within the spirit and scope of the invention as defined in the appended claims.

I claim:

1. In a square for use in establishing a line on the base of a structure perpendicular to a wall extending from the base, the combination comprising,
    unitary first and second arm members extending at right angles to each other, said first and second arm members having T-shaped cross sections, said first and second arm members comprising,
    first and second coplanar stem members having inner and outer edges, and
    first and second flanges extending along the inner edge of the respective first and second stem members, respectively, said first and second flanges being of uniform, equal, height, the outer free edge of one of said first and second arm members being adapted to abut the wall associated with the base with the other arm member extending perpendicular to the wall for use in marking off the base along said flange on the other arm member, said square including at least one gauge member secured to the stem member of the other of said first and second arm members said gauge member including a gauge plate extending parallel to the one arm member abutting the wall of the structure for use in cross marking the line established using said flange on the other arm member, said gauge plate having a height equal to the height of said first and second flanges.

2. In a square as defined in claim 1 including releasable securing means for releasably securing said gauge member to the stem member at any desired position within a range of positions along said stem member.

3. A square for laying out a web of structural steel beams having fillets at the intersection of the beam web and flanges, said square comprising, a unitary pair of arms extending at right angles to each other, said arms having a substantially T-shaped cross section comprising coplanar stem portions and flanges along inner edges of said stem portions, the square being adapted for support by said flanges on the web of a structural beam with the stem portion of one of said pair of arms in abutting relationship with a flange of the structural beam, the flange of the other of said pair of arms being used for marking off the beam web along a line perpendicular to the beam flange, at least one gauge member secured to the other arm of the square, and releasable securing means for releasably securing said gauge member to the stem portion of the other arm of the square at any desired position within a range of positions therealong, said gauge member including a gauge plate extending perpendicular to the arm to which the gauge member is releasably secured, the height of said gauge plate being substantially the same as the height of said arm flanges for use in cross marking lines established by use of the flange on said arm of the square to which said gauge member is secured.

4. A square for laying out a web of a structural steel beam as defined in claim 3 including indicia on the stem portion of the arm to which said gauge member is secured for use in positioning the gauge member therealong.

* * * * *